United States Patent [19]

Föhl

[11] Patent Number: 4,828,286
[45] Date of Patent: May 9, 1989

[54] GAS CUSHION IMPACT PROTECTION DEVICE FOR MOTOR VEHICLES

[75] Inventor: Artur Föhl, Schorndorf, Fed. Rep. of Germany

[73] Assignee: TRW Repa GmbH, Alfdorf, Fed. Rep. of Germany

[21] Appl. No.: 74,878

[22] Filed: Jul. 17, 1987

[30] Foreign Application Priority Data

Jul. 22, 1986 [DE] Fed. Rep. of Germany ....... 3624671
Sep. 9, 1986 [DE] Fed. Rep. of Germany ....... 3630685

[51] Int. Cl.⁴ ..................... B60R 21/20; B60R 21/22
[52] U.S. Cl. ................................... 280/731; 280/743; 383/3
[58] Field of Search ............... 280/728, 734, 735, 743, 280/731, 736, 740; 383/3, 907; 422/165, 166

[56] References Cited

U.S. PATENT DOCUMENTS

| | | | |
|---|---|---|---|
| 3,618,979 | 11/1971 | Gulette | 280/743 |
| 3,727,942 | 4/1973 | Arntson et al. | 280/743 |
| 3,752,501 | 8/1973 | Daniel et al. | 280/731 |
| 3,819,203 | 6/1974 | Radke et al. | 280/731 |
| 3,845,970 | 11/1974 | Herrmann | 280/731 |
| 3,879,056 | 4/1975 | Kawashima et al. | 280/743 |
| 3,895,823 | 7/1975 | Stephenson | 280/731 |
| 3,964,394 | 6/1976 | Wolf | 280/728 |
| 3,968,979 | 7/1976 | Schiesterl | 280/731 |
| 4,278,638 | 7/1981 | Nilsson et al. | 280/731 |

FOREIGN PATENT DOCUMENTS

| | | |
|---|---|---|
| 2058411 | 6/1972 | Fed. Rep. of Germany . |
| 2114945 | 10/1972 | Fed. Rep. of Germany . |
| 2141378 | 2/1973 | Fed. Rep. of Germany . |
| 2143165 | 3/1973 | Fed. Rep. of Germany . |
| 2150465 | 4/1973 | Fed. Rep. of Germany . |
| 2262346 | 6/1974 | Fed. Rep. of Germany . |
| 2359952 | 6/1974 | Fed. Rep. of Germany . |
| 23060926 | 6/1974 | Fed. Rep. of Germany . |
| 2518460 | 10/1975 | Fed. Rep. of Germany . |
| 2552815 | 5/1977 | Fed. Rep. of Germany . |

Primary Examiner—Charles A. Marmor
Assistant Examiner—Karin Tyson
Attorney, Agent, or Firm—Tarolli, Sundheim & Covell

[57] ABSTRACT

In the dish-shaped hub body of a steering wheel between two concentric cylindrical walls and a bottom wall connecting them an annular cavity is formed into which the propellent charge of a gas generator is introduced. This cavity is sealed by an outwardly arched closure plate provided with gas passage openings. An inflatable gas bag in the form of a hose ring is secured with its opening edges to a support plate which is secured at its peripheral edge to the steering wheel body. A separate gas generator housing can be dispensed with.

19 Claims, 4 Drawing Sheets

GAS CUSHION IMPACT PROTECTION DEVICE FOR MOTOR VEHICLES

The present invention relates to improvements in a gas cushion impact protection device for motor vehicles.

A gas cushion impact protection device is generally provided with an inflatable gas bag which is integrated on the driver side of the motor vehicle into the steering wheel. When a sensor detects deceleration values indicative of a collision a trigger signal for the fuse of a propellent charge forming part of a gas generator is produced. The gas bag is then inflated within a few milliseconds by the gases generated by the gas generator. The gas bag is accommodated in a dish-shaped hub body of the steering wheel. The hub body comprises a cental bore for introduction of the end of the steering shaft which projects into the hub body and is secured there by means of a nut. After mounting of the steering wheel on the steering shaft the gas generator and gas bag are introduced into the dish hub body and mounted therein. Between the end of the steering shaft and the gas generator a certain axial spacing is maintained which is to ensure that in an accident the steering wheel body can deform to a certain extent without the gas generator striking the end of the steering shaft. This however results in a large axial overall length of the steering wheel with the gas cushion impact protection device integrated therein.

The present invention provides an improved gas cushion impact or collision protection device of the aforementioned type for compact accommodation in the steering wheel, easy assembly and economical series production.

In the gas cushion impact protection device according to the invention the gas generator comprises on its side facing the steering shaft a recess which is coaxial therewith and the dimensions of which transversely of the axis of the steering shaft are at least equal to the outer diameter of the nut. On deformation of the steering wheel body due to a violent collision the end of the steering shaft with the nut screwed thereon and possibly washer can enter the recess without striking the gas generator. It is therefore not necessary to maintain a relatively large axial safety distance between gas generator and the end of the steering shaft. The gas generator can thus be moved forward into the vicinity of the bottom of the dish-shaped hub body.

The recess of the gas generator can be formed in the manner of a blind hole with the opening facing the steering shaft. Regarding the accommodation and assembly of the gas generator such embodiments are similar to conventional constructions and can consequently be easily and rapidly put into practice. However, according to a further development of the invention the recess extends in the axial direction completely through the gas generator and is moreover dimensioned with adequate width to enable an assembly tool for assembling the nut on the end of the steering shaft to be introduced through the recess. It is then firstly possible to move the gas generator still further in the direction of the bottom of the dish-shaped hub body. Secondly, however, this opens up the very advantageous possibility of supplying the steering wheel to the assembly line with the gas generator already installed instead of installing the gas generator subsequently into the already mounted steering wheel. In a further development of the invention the gas generator is not only annular but in addition the gas bag is formed as an annular hose member. The steering wheel can then be supplied with an already completely integrated gas cushion impact protection device as a complete construction unit or assembly which can then be secured in usual manner by means of a nut to the end of the steering shaft. Subsequently the opening leading through the gas generator is sealed with a stopper or plug.

In the embodiments previously described as in conventional gas cushion impact protection devices a separate housing is required for the gas generator. Due to the extremely high pressures which occur when the propellent charge is fired this housing must meet the highest demands as regards mechanical strength. The production of such housings is complicated and involves using high-quality materials and complicated technology. The gas generators available at present and suitable for gas cushion impact protection devices are therefore very expensive and this is a great obstacle to the general adoption of gas cushion impact protection devices, which are acknowledged to be particularly effective. However, hitherto no consideration was given to constructing gas generators for these purposes without a separate housing.

According to a particularly advantageous further development of the invention at least part of the housing of the gas generator is formed by a wall of the hub body. It is convenent to form the bottom of the dish-shaped hub body in annular cup shape. Another part of the gas generator housing is then formed in particularly convenient manner by a closure plate which is provided with gas passage openings and which is secured to the edge of the wall of the hub body forming the other housing part. This embodiment of the invention is based on the recognition that the hub of the steering wheel is also a part of high mechanical strength and in the interior offers abundant space for accommodating the necessary propellant charge with fuse and filter. Thus, a separate gas generator housing can be dispensed with.

The propellent charge with fuse may be incorporated as hermetically encapsuled construction unit in a thin-walled capsule housing into the gas generator housing formed in this manner. This embodiment has the advantage that on introducing the propellent charge into the charge generator housing no particular precautions need be taken for keeping away impurities, moisture and the like.

A particularly economic production is however obtained if according to a further embodiment of the invention the drive propellent is directly introduced into the cavity which is formed by the wall of the hub body forming the one housing part of the gas generator, whereupon the closure plate provided with gas openings is placed thereon with interposition of a filter and secured to the edge of the gas generator housing.

With a gas bag in the form of a tubular ring said bag according to a preferred embodiment is made up of two textile or sheet material discs which are flat in the spread-out state and are connected together at their outer periphery and which each have a centrally disposed round opening, of which the one lying concentrically to the other is smaller than the other opening and surrounded thereby, and of a centre portion which is tubular in the expanded state and the one end of which is connected to the edge of the smaller opening and the other end of which forms the inner circular opening edge of the tubular ring gas bag, the outer opening edge of which is formed by the edge of the larger opening. The tubular centre portion can in turn also consist of two circular discs of textile or sheet material which are connected together at their outer edges and are flat in the spread-out state, or of a portion having flange-like widened ends and being tubular in the unstressed state. When using a conventional textile or sheet material for making gas bags the centre portion has small extensibility in the axial direction. This therefore restricts the expansion of the activated gas bag in the axial direction of its centre portion, i.e. in the direction towards the vehicle occupant to be protected. With conventional gas bags for limiting the expansion of the gas bag retaining straps are provided in the interior thereof. Such retaining straps can be dispensed with in the embodiment of the gas bag set forth here because the centre portion exerts the corresponding limiting function. A further particular feature of this embodiment of the gas bag resides in that in the activated state it has an outer form which comes very close to the continuous outer contour of balloon-like gas bags although the gas bag has the form of a tubular ring. Admittedly, in the centre of the outer face of the gas bag in the activated state there is a small depression but this is of no significance because the outer edge thereof is formed by the annular connecting region between the edge of the centre opening of the material disc facing the vehicle occupant and the corresponding end of the centre portion and is therefore strengthened and hardly extensible. The gas bag described above can be made economically at low cost using known production methods.

Further advantages and features of the invention will be apparent from the following description of examples of embodiment and from the drawings, to which reference is made.

Figure 1:
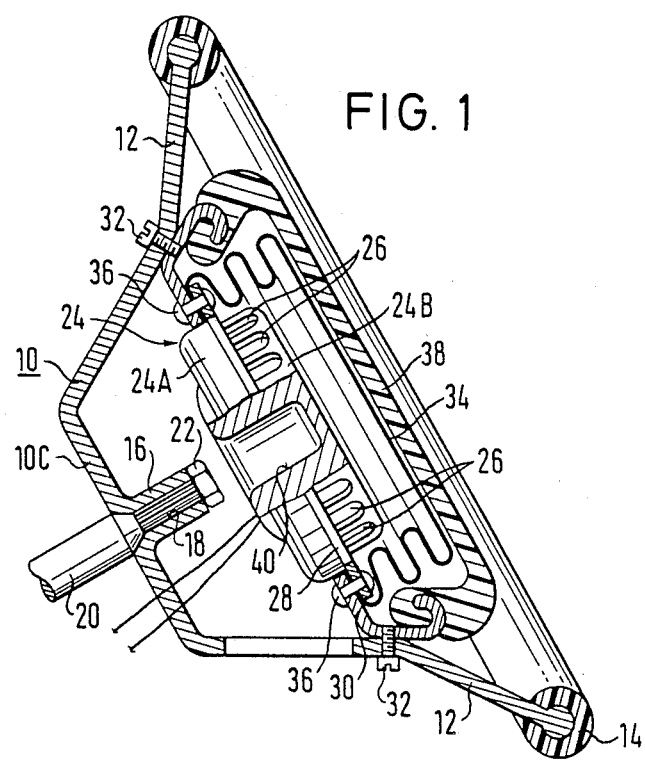
FIG. 1 is a schematic cross-sectional view of a first embodiment.

In the embodiment shown in FIG. 1 a steering wheel comprises a dish-shaped hub body 10 to which via steering wheel spokes 12 a steering wheel rim 14 is joined. In the centre of the flat bottom 10A of the hub body a mounting element 16 is disposed which projects into the interior of the dish-shaped hub body 10 and through which a bore 18 leads. Led through the bore 18 is the tapered serrated end of a steering shaft 20. A nut 22 is screwed onto the end of the steering shaft 20 projecting into the interior of the hub body 10 to secure the steering wheel to the steering shaft 20.

A generally annular gas generator 24 is accommodated in the interior of the dish-shaped hub body 10. Said gas generator 24 consists of a dish-like housing bottom 24A and a housing cover 24B which is provided with gas passge openings 26. Via an annular flange 28 the housing of the gas generator 24 comprising the housing bottom 24A and housing cover 24B is connected to a support plate 30 which in turn is connected by screws 32 to the steering wheel body. Between the support plate 30 and the flange 28 the edge of a gas bag 34 is clamped. The connection between the support plate 30 and flange 28 is for example by means of rivets which extend through aligning openings in the support plate 30 and the flange 28 and also through the edge of the gas bag 34. The peripheral edge of the support plate 30 is bent inwards and serves to secure a cover 38 whose peripheral edge is complementary to the inwardly bent peripheral edge of the support plate 30 so that the cover 38 can be secured by a snap-action connection to the peripheral edge of the support plate 30. In the inner space formed between the support plate 30 and cover 38 the folded gas bag 34 is accommodated.

The gas generator 24 is provided with a cylindrical recess 40 which is formed in the manner of a blind hole and the opening of which lies opposite the end of the steering shaft 20 and the nut 22. The recess 40 is arranged coaxially with the end of the steering shaft 20 so that said end with the nut 22 and the mounting element 16 on deformation of the steering wheel body in the course of an accident can penetrate the recess 40 without striking the gas generator 24. Between the nut 22 and the bottom of the recess 40 a spacing is left which is dimensioned according to the expected deformation of the steering wheel body.

It is apparent that the gas generator 24 in contrast to conventional technique is made annular. It has been found that an annular housing can also be formed without particular expenditure and with adequate strength to withstand the high pressures which occur when the propellent charge disposed in the interior of the housing is fired. The gas generator 24 can however due to its annular form be moved further towards the bottom of the dish-shaped hub body 10 so that compared with the prior art a considerable reduction of the axial overall length is achieved.

Figure 2:
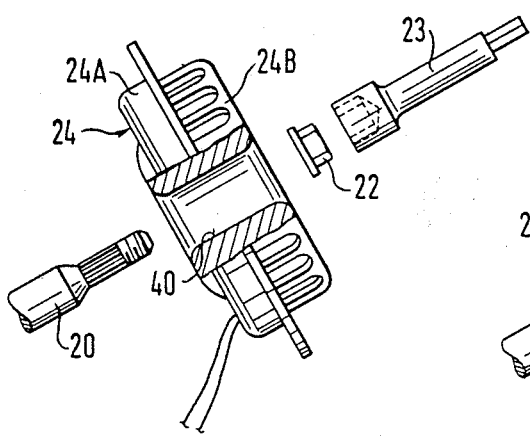
FIG. 2 is a schematic fragmental view of a second embodiment in which the gas generator is shown partially in section.

In the embodiment illustrated in FIG. 2 the recess 40 is led completely through the gas generator 24 and thus forms a continuous opening which moreover is dimensioned large enough to enable the nut 22 and a socket spanner 23 to be introduced therethrough. On the one hand, with this embodiment the gas generator 24 can be moved still closer to the bottom of the dish-shaped hub body 10, further reducing the axial overall size. On the other hand, the steering wheel with the already mounted gas generator can be supplied as constructional unit to the assembly line and as such mounted on the steering shaft 20. It is thus not necessary to install the gas generator 24 subsequently in the already mounted steering wheel.

Figure 3:
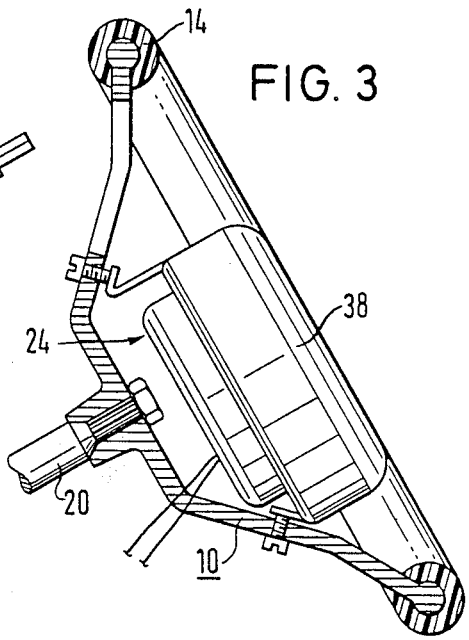
FIG. 3 is a cross-sectional view which shows an eccentrc arrangement of the impact protection device in the steering wheel.

It is apparent in FIG. 3 that the gas bag impact protection device integrated into the steering wheel can be arranged eccentrically in the steering wheel body to give unrestricted vision of the instrument panel.

Figure 4:
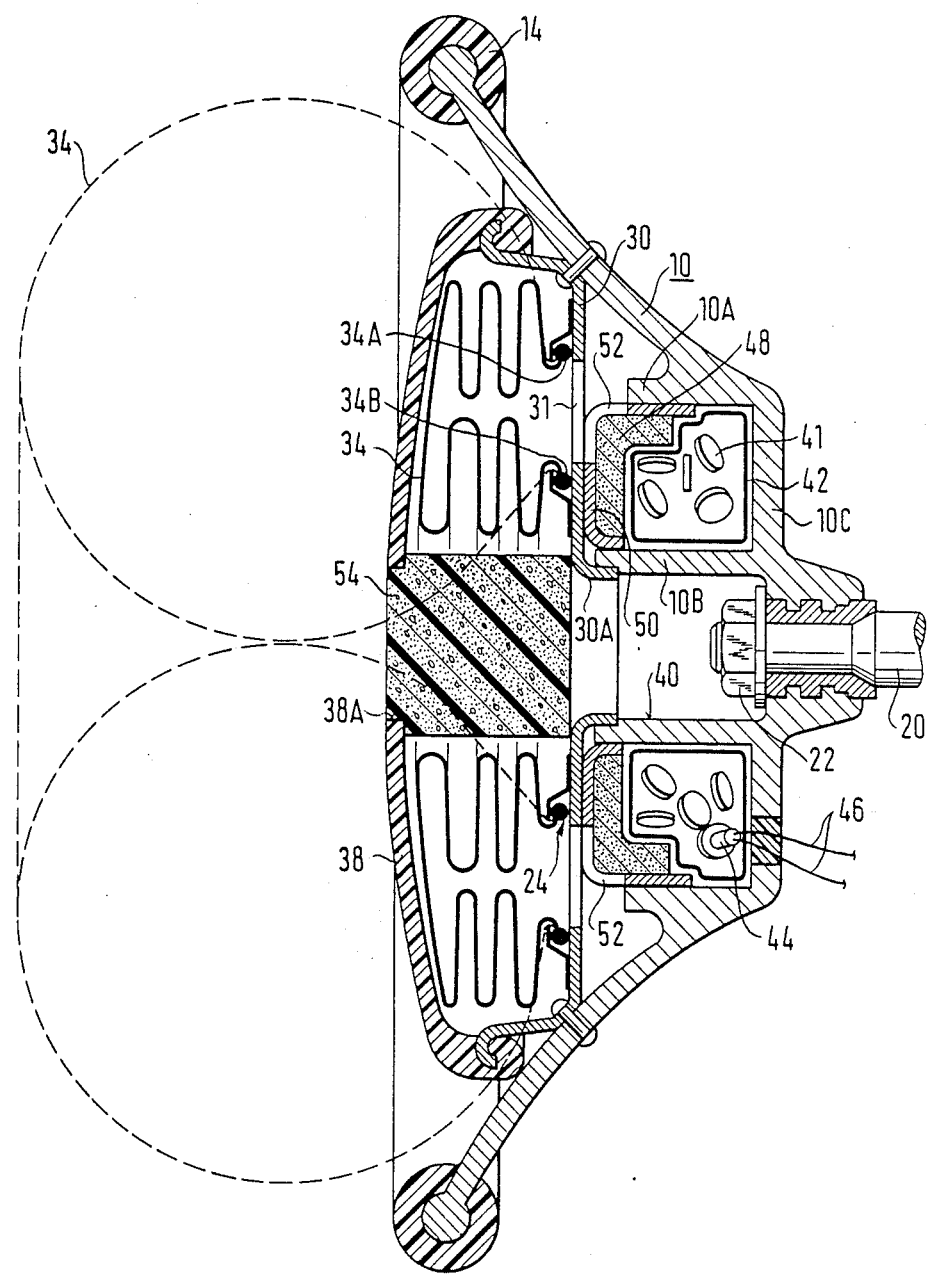
FIG. 4 is a cross-section of another embodiment.

The preferred embodiment shown in FIG. 4 is a further development of the embodiment of FIG. 2. Whereas in the embodiment of FIG. 2 a separate gas generator housing is used consisting of housing bottom 24A and housing cover 24B, in the embodiment of FIG. 4 part of the gas generator housing is formed by a wall of the hub body 10. The hub body 10 comprises on its inner side a depression in the form of an annular bowl which is defined by an external cylindrical wall 10A, an internal cylindrical wall 10B and an annular bottom wall 10C connecting said walls. The internal cylindrical wall 10B surrounds the opening 40 through which access to the nut 22 is possible. The annular space formed between the walls 10A, 10B and 10C is filled by a propellent charge 41. The propellent charge 41 consisting of individual solid particles is hermetically sealed in a thin-walled capsule housing 42 which can be made from plastic. Within said capsule housing 42 an electrical fuse 44 is also arranged, the terminal wires 46 of which are led through the capsule housing 42 and connected in conventional manner to a trigger circuit. The propellent charge of the gas generator thus forms a hermetically encapsulated constructional unit. No special precautions need be taken for inserting this annular assembly into the likewise annular receiving space between the walls 10A, 10B and 10C. Subsequently, a filter pack 48 which is also annular is placed thereon. Finally, an annularly outwardly curved closure plate 50 provided with gas pasage openings 52 is inserted between the facing cylindrical inner faces of the walls 10A and 10B and sealingly connected to the adjacent edges of said walls 10A and 10B, in particular by friction welding or electron welding. The connection may however also be established by rivets, screws, beading or the like.

According to another embodiment which is not separately illustrated in the drawings the capsule housing 42 is dispensed with and the propellent charge 41 is introduced directly into the annular cavity defined by the walls 10A, 10B and 10C. Precautions must then be taken for avoiding penetration of moisture and foreign bodies. However, the production costs are eliminated for a previous manufacture of the propellent charge as prefabricated hermetically encapsulated construction unit.

In a manner similar to the embodiment of FIG. 1 the gas bag 34 is secured to a support plate 30 which in turn is secured to the steering wheel body. The support plate 30 is provided with gas passage openings 31. However, in contrast to the embodiment of FIG. 1 the gas bag 34 is not balloon shaped but made in the form of a hose ring. The gas bage 34 is secured with its circular concentric opening edges 34A, 34B to the support plate 30, the gas passage openings 31 being disposed between these opening edges 34A, 34B. The support plate 30 is further provided with a central opening 30A which aligns with the opening formed by the recess 40. At the peripheral edge of the support plate 30 in the same manner as in the embodiment of FIG. 1 a cover 38 is secured. This cover 38 comprises however a central opening 38A which is sealed by an inserted plug 54 which is preferably made from foam material. The plug 54 also closes the opening formed by the recesses 30A and 40. Within the cavity formed between the inner side of the cover 38, the plug 54 and the support plate 30 the gas bag 34 is accommodated in a folded state. On activation of the gas generator the gases generated thereby pass through the filter pack 48 and the gas passage openings 52 into the interior of the gas bag 34 so that the latter is inflated and firstly the cover 38 pressed away from the peripheral edge of the support plate 30. Thereafter the gas bag 34 is inflated and assumes the inflated form shown in dashed line in FIG. 4.

Figure 5:
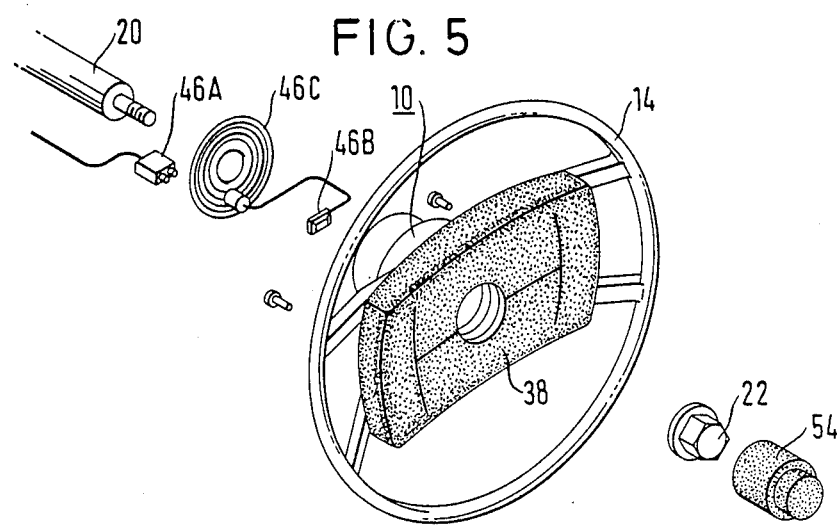
FIG. 5 is a perspective view of a construction unit ready for assembly comprising steering wheel and integrated gas bag impact protection device, in an exploded illustration.
Figure 6:
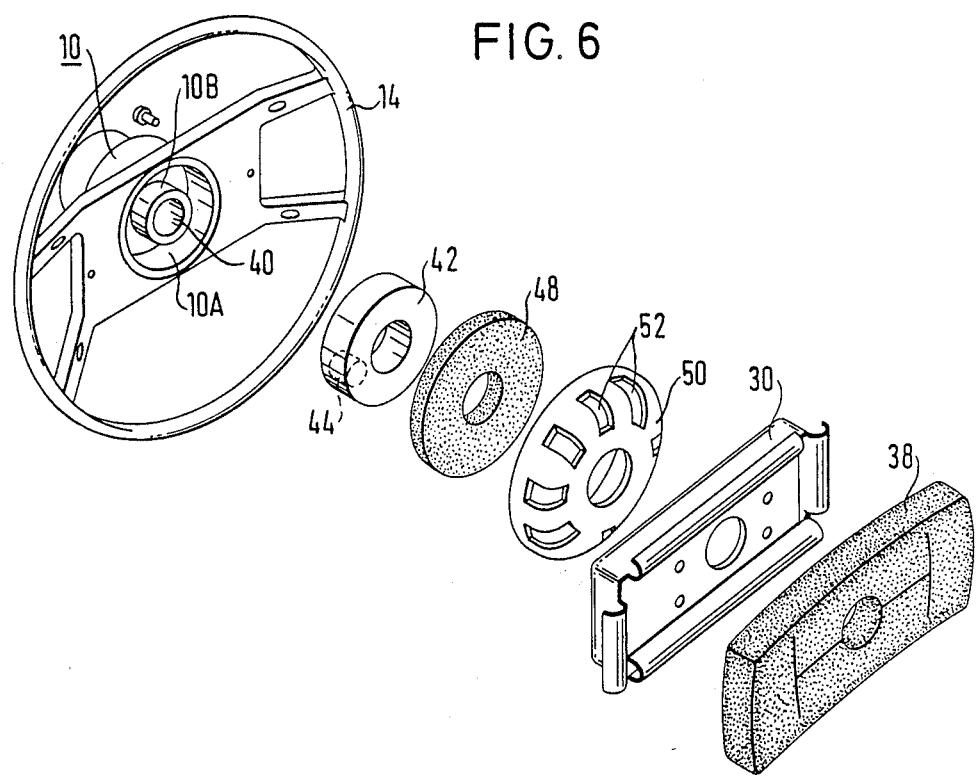
FIG. 6 is an exploded view of the assembly shown in FIG. 5.

As apparent from FIGS. 5 and 6 in the embodiment according to FIG. 4 a complete assembly consisting of steering wheel and gas bag impact protection device integrated therein can be delivered to the assembly line to be mounted as unit on the steering shaft 20. Subsequently the connection between the fuse and the trigger circuit is established by plug-contacts 46A and 46B and via a conventional wiper contact means 46C. Finally, the stopper 54 is inserted.

The individual components of the gas bag impact protection device of this embodiment are illustrated again in FIG. 6 in an exploded view.

Figure 7:
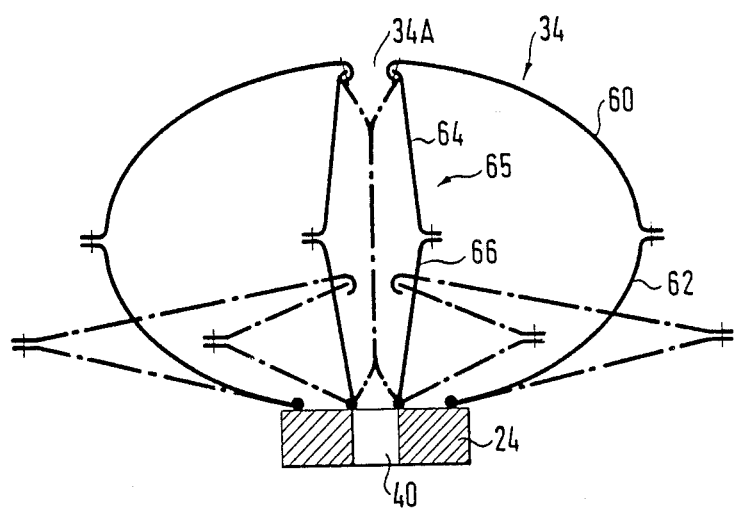
FIG. 7 is a schematic illustration of a preferred embodiment of a gas bag for the embodiment according to FIG. 4.
Figure 8:
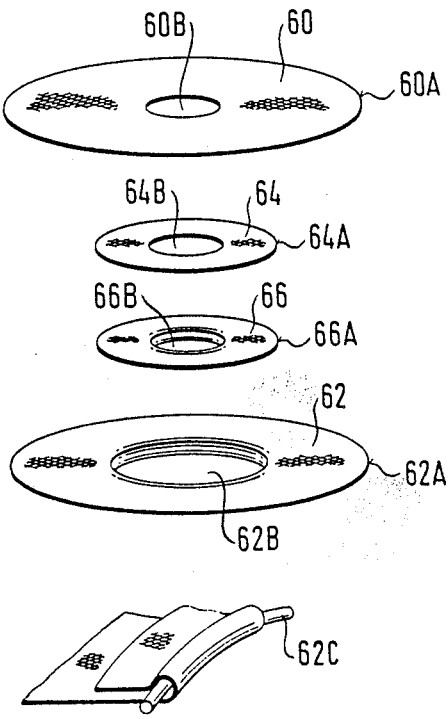
FIG. 8 is an exploded view of the components of the gas bag.

In FIG. 7, which shows a preferred embodiment of the tubular ring gas bag 34, the gas generator 24 is shown only schematically as ring part. The gas bag consists of two circular material discs 60, 62 of a flexible hardly extensible textile or sheet material which are circular in the spread-out state. The two material discs 60, 62 are connected together at their outer edge 60A or 62A respectively for example by adhesion, sewing, welding or the like. The two material discs 60, 62 each have a central opening 60B and 62B respectively, the greater, 62B, surrounding the smaller, 60B, concentrically. The edge of the opening 62B is reinforced by a ring insert 62C about which the edge region of the ppening 62B is fitted. In the region of the thus reinforced edge of the opening 62B the material disc 62 is secured at the outer periphery of the side of the gas generator 24 facing the vehicle occupant. Connected to the edge of the smaller opening 60B is the one end of a generally tubular centre portion 65, two embodiments of which are shown separately in FIGS. 9 and 10. In the embodiment according to FIGS. 7, 8 and 10 said centre portion 65 consists of two circular discs 64 and 66 which are flat in the spread-out state and are connected together at their outer edges 64A, 66A. The two circular discs 64, 66, the outer diameter of which is smaller than that of the material discs 60, 62, each have a central opening 64B and 66B respectively. The edge of the opening 64B is connected to the edge of the opening 60B of the material disc 60. The edge of the opening 66B is reinforced in the same manner as the edge of the opening 62B and serves for anchoring to the gas generator 24, the opening 66B surrounding the recess 40.

It is apparent from the illustration in FIG. 7, in which the gas bag 34 in full lines is shown in the almost completely expanded state and the state of the centre portion 65 in the completely expanded state and the form of the gas bag in the initial phase of the unfolding is shown in dashed line, that the outer contour of the expanded gas bag comes very close to that of a conventional balloon-like gas bag. In the centre of the outer face of the gas bag 34 facing the vehicle occupant a small depression 34A forms but this is of no consequence because its outer periphery is bordered by the mutually reinforcing edges of the openings 60B and 64B. The depression 34A is thus of no significance in practice. In the completely expanded position of the gas bag 34 the centre portion 65 is compressed over the greater part of its axial extent due to the pressure acting in the interior of the gas bag 34 so that between the recess 40 and the depression 34A no passage or cavity is formed. The centre portion 65 is further only slightly extensible in its axial direction. It thus limits the expansion of the gas bag 34 in the direction towards the vehicle occupant. Separate retaining straps as used in conventional balloon-type gas bags can be dispensed with.

Figure 9:
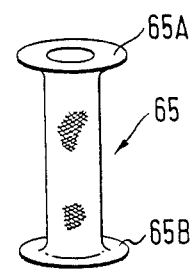
FIGS. 9 and 10 show two forms of a tubular centre portion of the gas bag.
Figure 10:
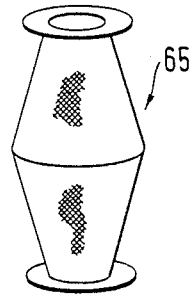

In the embodiment of the centre portion 65 shown in FIG. 9 said centre portion consists of a continuous tubular part with flange-like widened ends 65A, 65B. In this embodiment the centre portion 65 can for example be made on a circular knitting machine.

I claim:

1. A gas cushion impact device for accommodation in a hub body of a steering wheel comprising a gas generator having a propellant charge and a fuse, and a gas bag inflatable by the gases generated by said gas generator, said gas generator comprising an annular housing having an opening which extends in the axial direction through said annular housing, said gas bag being annular in shape and having an outer mounting edge and an inner mounting edge surrounded by said outer mounting edge and defining an annular inflating opening therewith, said gas bag comprising two material discs and a centre portion, said two material discs being flat in the spread-out state and being connected together at their outer periphery, one of said material discs having a centrally disposed circular openings defined by said outer mounting edge, said centre portion being tubular in an expanded state and having a first end defining said inner mounting edge, and a second end connected to the other of said material discs.

2. The gas cushion impact protection device according to claim 1 wherein at least a part of the gas generator housing is formed by a wall portion of the hub body.

3. The gas cushion impact protection device according to claim 2, wherein said wall portion of the hub body forming the housing part of the gas generator is shaped in annular cup form.

4. The gas cushion impact protection device according to claim 3, wherein another part of the gas generator housing is formed by a closure plate which is provided with gas passage openings and which is secured to the edge of the wall portion of the hub body forming the other housing part.

5. The gas cushion protection device according to claim 4, wherein said closure plate is generally annular.

6. The gas cushion impact protection device according to claim 5, wherein said closure plate is outwardly arched.

7. The gas cushion impact protection device according to claim 4, wherein the propellent charge of the gas generator is introduced directly into the cavity which is formed by the wall of the hub body forming said one housing portion of the gas generator and which is sealed by the closure plate, a filter being located between the propellent charge and the gas passage openings of the closure plate.

8. The gas cushion impact protection device according to claim 2, wherein the propellent charge and the fuse of the gas generator are combined to form a hermetically encapsulated integral unit in a thin-walled capsule housing and said integral unit is inserted into the gas generator housing.

9. The gas cushion impact protection device according to claim 1, wherein said opening is sealed by a plug.

10. The gas cushion impact protection device according to claim 1 wherein said device forms an assembly with a steering wheel ready for installation in a motor vehicle.

11. The gas cushion impact protection device of claim 1 wherein said other of said material discs has a central opening to the edge of which said second end of said centre portion is connected.

12. The gas cushion impact protection device according to claim 1, wherein said centre portion consists of two round discs which are connected together at their outer edges and are flat in the spread-out state and which each have a centrally disposed opening defining said first and second ends.

13. The gas cushion impact protection device according to claim 1, wherein said centre portion is formed by a part which is tubular in an unstressed state and has flange-like widened ends.

14. The gas cushion impact protection device according to claim 1 wherein the centre portion has a low extensibility in the axial direction.

15. A gas cushion impact protection device for accommodating in a hub body of a steering wheel and comprising a gas generator having a propellant charge and a fuse, and a gas bag which is inflatable by the gases generated by said gas generator, the hub body comprising an at least approximately central bore for introduction of the end of a steering shaft which projects into the hub body and is secured there by means of a nut, the gas generator having an annular housing forming a central opening which extends in the axial direction through the gas generator housing and has adequate dimensions for passage of a mounting tool for mounting the nut on the end of the steering shaft, said gas bag being annular in shape and having an outer circular opening edge secured to a support plate carried by the hub body and an inner central opening edge secured around said central opening of the gas generator housing, the gas bag being made of two material discs which are flat in the spread-out state and are connected together at their outer periphery and which each have a centrally disposed round opening, of which one opening lying concentrically to the other is smaller than said other opening and is surrounded thereby, and of a centre portion which is tubular in the expanded state and one end of which is connected to an edge defining the smaller opening and the other end of which forms the inner circular opening edge of the annular gas bag the outer edge of which is formed by the edge defining the larger opening.

16. The gas cushion impact protection device according to claim 15, wherein the centre portion consists of two round discs which are connected together at their outer edges and are flat in the spread-out state and which each have a centrally disposed opening, of which one opening is connected to the edge of the smaller opening of the one material disc and the other defines the inner opening edge of the gas bag.

17. The gas cushion impact protection device according to claim 15, wherein the centre portion is formed by a part which is tubular in the unstressed state and has flange-like widened ends.

18. The gas cushion impact protection device according to claim 11, wherein the centre portion has a low extensibility in the axial direction.

19. A gas cushion impact protection device for accommodation in a hub body of a steering wheel comprising a gas generator having a propellant charge and a gas bag which is inflatable by the gases generated by said gas generator, said gas bag being annular in shape and having outer and inner mounting edges for connection to said gas generator, the outer mounting edge surrounding the inner mounting edge and defining an annular inflating opening therewith, said gas bag comprising two material discs which are flat in the spread-out state and are connected together at their outer periphery and a centre portion, one of said material discs having a centrally disposed opening defined by said outer mounting edge, said centre portion being tubular in an expanded state and having a first end defining said inner mounting edge and a second end connected to the other of said material discs.

* * * * *

UNITED STATES PATENT AND TRADEMARK OFFICE
CERTIFICATE OF CORRECTION

PATENT NO. : 4,828,286
DATED : May 9, 1989
INVENTOR(S) : Artur Fohl

It is certified that error appears in the above-identified patent and that said Letters Patent is hereby corrected as shown below:

Column 7, Line 6, insert --protection-- between "impact" and "device"

Column 8, Line 50, change "11" to --15--

Signed and Sealed this

Thirteenth Day of March, 1990

Attest:

JEFFREY M. SAMUELS

*Attesting Officer*    Acting Commissioner of Patents and Trademarks